United States Patent [19]

Bocchi

[11] Patent Number: 4,943,406
[45] Date of Patent: Jul. 24, 1990

[54] METHOD FOR PRODUCTION OF CONTAINERS IN THERMOPLASTIC MATERIAL, IN PARTICULAR SHEETS OF POLYETHYLENE-TEREPHTHALATE

[76] Inventor: Luigi Bocchi, Via Dei Cignoli, 1 -- 20151 Milano, Italy

[21] Appl. No.: 366,688

[22] Filed: Jun. 15, 1989

Related U.S. Application Data

[63] Continuation-in-part of Ser. No. 76,062, Jul. 21, 1987, abandoned.

[30] Foreign Application Priority Data

Jul. 31, 1986 [IT] Italy ................. 21353 A/86

[51] Int. Cl.$^5$ ................. B29C 51/04; B29C 51/42
[52] U.S. Cl. ................. 264/522; 264/521; 264/549; 264/554; 425/384; 425/388
[58] Field of Search ............. 264/519, 521, 522, 544, 264/549, 550, 553, 554, 571; 425/383, 384, 387.1, 388, 403

[56] References Cited

U.S. PATENT DOCUMENTS

| | | | |
|---|---|---|---|
| 4,511,322 | 4/1985 | Jakobsen et al. | 425/384 |
| 4,564,495 | 1/1986 | Nilsson et al. | 264/292 |
| 4,582,665 | 4/1986 | Jabarin | 264/550 |
| 4,701,121 | 10/1987 | Jakobsen et al. | 425/526 |
| 4,704,243 | 11/1987 | Nilsson et al. | 264/292 |
| 4,711,624 | 12/1987 | Watson | 425/526 |

FOREIGN PATENT DOCUMENTS

| | | |
|---|---|---|
| 81451 | 6/1983 | European Pat. Off. |
| 2089276 | 6/1982 | United Kingdom |
| 2138349 | 10/1984 | United Kingdom |

Primary Examiner—Jill L. Heitbrink
Attorney, Agent, or Firm—Bucknam and Archer

[57] ABSTRACT

Method for the production of heat resistant polyethyleneterephthalate containers by means of thermoforming with a longitudinal and radial direction stretching of a sheet (1) of unstretched amorphous polymer in a die (2) kept at a temperature of about 175°-180° C. The container is consolidated and extracted by a counterdie (4), cooled and provided with suction means. The containers thus are stable at sterilization temperature in boiling water and in steam at 130° C.

3 Claims, 1 Drawing Sheet

METHOD FOR PRODUCTION OF CONTAINERS IN THERMOPLASTIC MATERIAL, IN PARTICULAR SHEETS OF POLYETHYLENE-TEREPHTHALATE

This is a continuation-in-part application of Ser. No. 076,062, filed July 21, 1987, now abandoned.

The present invention refers to a method for the production of containers of thermoplastic material, in particular sheets of polyethyleneterephthalate, and containers thus obtained. More particularly, the present invention refers to a method for the production of containers from laminated sheets of amorphous polyethyleneterephthalate.

It is known that polyethyleneterephthalate forms part of the polyester resin, i.e. of the resins obtained by polycondensation or polytransesterification of a polycarboxylic acid or of one of its esters with a polyvalent alcohol with formation of a plurality of ester links (polyesters).

The particular types of acids and alcohols chosen and the possible presence of other comonomers determine various categories of polyesters.

In particular, we recall:

(1) unsaturated polyesters: they are linear polyesters derived from dicarboxylic acids and bivalent alcohols capable of forming crossed links with vinylic monomers, giving origin to thermosetting copolymers;

(2) saturated polyesters: they are polyesters with high molecular weight and very oriented, derived from dicarboxylic acids and bivalent alcohols which are generally used to produce yarns and films of various thickness, but always thermoplastic. The first group is mainly worked by pouring, thanks to the easy manipulation in the liquid state, the easy penetration between the reinforcing fibres and the excellent dimensional stability of the products. However, it needs a large number of dies and counterdies.

The second group permits us to obtain, by means of spinning, yarns suited to any type of fabric, and, through lamination, laminated sheets of any thickness, colour and possible longitudinal profiling.

Also, thanks to their thermoplasticity, the laminated sheets can be shaped, by thermoforming, into any article with exceptional characteristics, particularly if special methods, such as two-way stretching, are adopted.

Among these materials particular importance has been acquired by polyethyleneterephthalate containing the repetitive units:

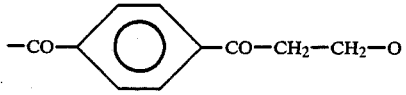

Polyethyleneterephthalate does not have unsaturated links and normally therefore does not cross-link so the product remains thermoplastic.

Polyethyleneterephthalate is a colourless product which melts at around 265° C., soluble at environmental temperature in fluoroacetic acid and phenols. For cooling of the melted mass, it can be obtained in amorphous form, stable at environmental temperature. The crystallization rate of the amorphous product increases with temperature and reaches a maximum of around 180° C. Crystalline density is 1.45 g/cm$^3$. It has a glass transition temperature (Tg), which, for the amorphous material, is approximately 80° C. and varies with crystallinity. It is thus possible to have a totally amorphous product with thermal distortion of 115° C., according to the usual standards.

It has now been surprisingly found by the Applicant that, when a shaped article of polyethyleneterephthalate, stretched in the longitudinal and radial directions, is placed in contact with a surface heated at a temperature of about 175°–180° C. for a very short time and then rapidly cooled, it very quickly acquires high heat resistance characteristics, changing from a thermoplastic product to a product more resistant to temperature. Therefore, for example, a polyethyleneterephthalate container stretched in the longitudinal and radial directions, to be used for food packs, if submitted to this heat treatment, can be sterilized in boiling water or with steam at 130° C., without any variations in form and characteristics.

The object of the present invention is to provide a method for the production of a container of bistretched polyethyleneterephthalate, heat resistant at temperature above boiling point and in steam at 130° C.

According to the present invention, this object is achieved by a method of production of a container of polyethyleneterephthalate stretched in the longitudinal and radial direction from a sheet of amorphous, polyethyleneterephthalate which consists of the following steps:

(a) preheating a sheet of amorphous, polyethyleneterephthalate to such a temperature that said sheet is preheated, softened and may be drawn;

(b) placing said sheet in a die having a female mold and a male plug, said male plug having a truncated cone shape with side surfaces upwardly converging; said female mold having a bottom and side walls;

(c) heating said female mold to a temperature of about 175°–180° C.;

(d) heating said male plug to a temperature of about 160°–166° C.;

(e) drawing said preheated sheet into contact with the bottom of said female mold by pressing with said male plug and longitudinally drawing the sheet whereby only the drawn bottom part crystallizes in contact with the bottom of said female mold;

(f) introducing compressed air or inert gas into the space between the female mold and said sheet, to cause said sheet to adhere to the male plug;

(g) introducing then compressed air or inert gas into the space between said male plug and said sheet, whereby said sheet separates from the sides of the male plug, comes in contact with the heated surface of the female mold, stretching in the radial direction occurs, the sheet crystallizes and a container of polyethyleneterephthalate stretched in the longitudinal and radial direction is obtained;

(h) cooling said container from step (g) and withdrawing it from the die.

The time the bistretched sheet remains in contact with the inside surface of the female mold may be very brief. Such as some fractions of a second.

The cooling of the container thus formed and the withdrawing from the die are obtained by a counterdie inserted in the formed container, having a shape complementary to the die, cooled and kept under suction.

The cooling counterdie is kept at low temperature by the circulation of cold water or cooling liquid at 5° C. and is connected to a vacuum pump by means of peripheral holes to facilitate the subsequent extraction of the product formed.

The method of the present invention permits the production, in particular, of containers to be used welded, like those for soft drinks, or open like trays, used for food, cosmetic industry etc. Without adhering to any particular theory, it is believed that the results of heat resistance, obtained through the method of the present invention, are attributable to the fact that crystallization of the polyethyleneterephthalate takes place at high rate and in a very short time, as the mass has already absorbed the thermoforming temperature and can very quickly surpass the gradient towards crystallization.

Moreover, the rapid cooling brings about a temperature, which counteracts the tendency to shrinkage due to the rise in density, creating a surface layer with higher mechanical and thermic characteristics. However, the above interpretation should not be considered limitative of the scope of the present invention.

To more fully understand the present invention, a detailed description is given of the method used to obtain a particular form of a container, referring to the attached drawings, which represent a preferred, illustrative but not limiting embodiment of the present method.

Sheet (1) of polyethyleneterephthalate or equivalent is first brought, by conventional methods, to the thermoforming temperature. Sheet (1), preheated to such a temperature to be softened to the point where it can be easily drawn and oriented, generally between about 80° C. and 130° C., is positioned over the cavity of the die. The die comprises a female mold (2) and a male plug (3). The male plug (3) has a truncated cone shape and the side surfaces converge upwardly, so that it contacts only the bottom part of the Polyethyleneterephthalate sheet (1). The male plug (3) is heated to about 160°–166° C. and slightly higher, according to the type of material used.

The female mold (2) is heated at higher temperature and about 175°–180° C. with slight variation according to the thickness and type of material.

The sheet (1) is thrown towards the bottom of the female mold (2) by the male plug (3).

Figure 1:
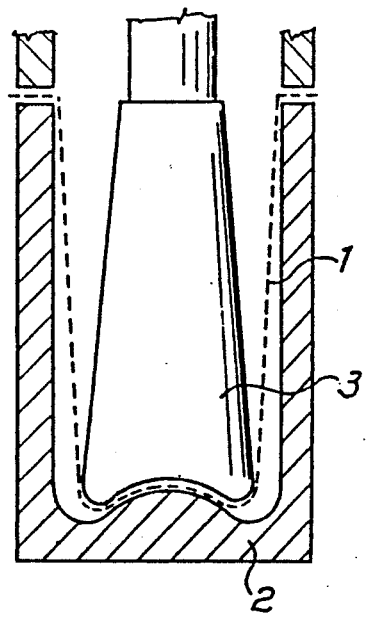
FIG. 1 is a schematic diagram of the longitudinal stretching of the sheet.

As shown in FIG. 1, the shape of the male plug (3) is such that only the bottom part of the sheet contacts the bottom part of the female mold (2) due to the truncated cone shape of the male plug. During this step, the bottom of the softened non-oriented sheet (1) is radially and longitudinally drawn, that is drawn bi-axially, and crystallizes; while the side walls are longitudinally drawn, that is drawn mono-axially and do not crystallize since they are kept at a lower temperature.

Figure 2:
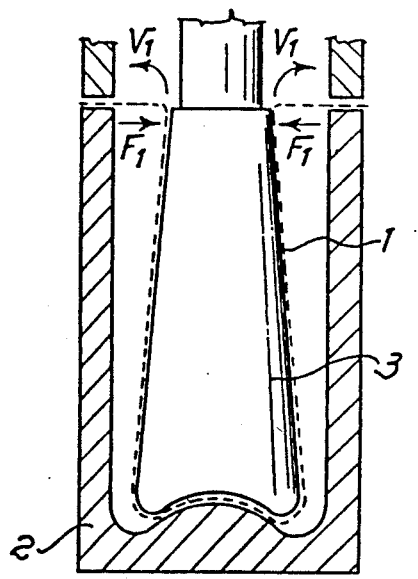
FIG. 2 shows the radial retraction phase.
Figure 3:
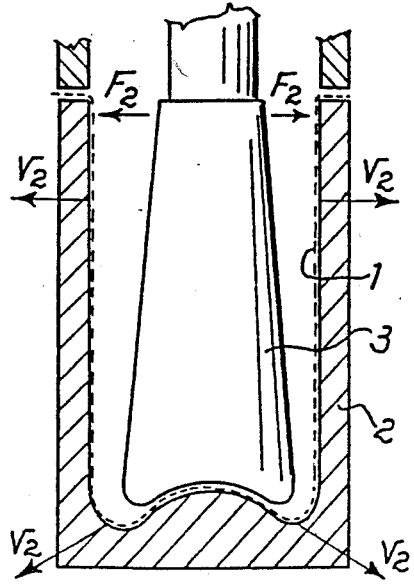
FIG. 3 shows the radial stretching of the sheet, the conformation thereof and the start of crystallization.

When the male plug (3) reaches the bottom (see FIG. 1), compressed air is introduced by conventional means, between female mold (2) and sheet (1), as shown in FIG. 2. The sheet has now acquired truncated cone shape and it is a mono-axially oriented sheet and adheres to the thermoregulated male plug (3). A container with upward convergent transition is thus obtained. This container conformation can be obtained by means of vacuum or by integrating the pressure of the compressed air with the vacuum applied between the female mold and the sheet (see arrows V1 of FIG. 2).

After the time necessary for sheet (1) to detension and stabilize itself, air or compressed inert gas is introduced between male plug (3) and sheet (1). In this way, sheet (1) is detached from male plug (3) and, following the arrows F2, comes into contact with the walls of female mold (2), so that the sheet is drawn also in the transverse or radial direction. The female mold (2) has preferably a slightly truncated cone shape with the side walls divergent in the upward direction. Sheet (1), which, up to this stage of the process, has not risen above 166° C., is in the glass state and has undergone a bidirectional expansion, elimination directional tension which makes the container formed fragile.

Figure 4:
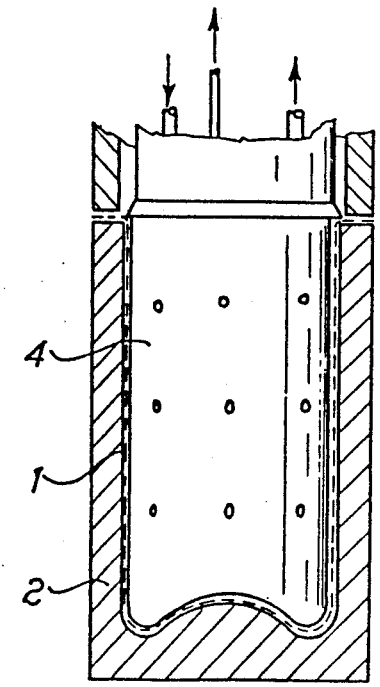
FIG. 4 shows the cooling and suction phase on the cold counterdie for extraction.

According to the present invention, when sheet (1) is in contact with the walls of female mold (2), heated to the higher temperature and up to 180° C., it quickly reaches the crystallization and crosslinking temperature, thanks to the heating of first forming already received, reaching a higher specific weight, higher mechanical strength and generally acquiring a typical pearly appearance. Sheet (1), which was first perfectly thermoplastic and amorphous, changes to a condition of higher heat resistance and crystallinity. To rapidly block the correct form, and confer a sort of hardening and extract the container, as shown in FIG. 4, the forming male plug (3) is removed and cooling, cutting and extracting counterdie (4) rapidly introduced. It has the complementary form of the container formed, has a cutting crown, is cooled by circulation of cooling water or liquid at 5° C. and connected by means of a large number of peripheral holes to a vacuum pump.

The insertion of the counterdie (4) separates the formed container from the forming ring, and keeps the container adherent to the cold walls and temperature. Extraction of cooling, sucking counterdie (4) drags with it the crystallized and/or heat resistant container at the same time that it cools it, so that it may be extracted, eliminating the vacuum and introducing a low pressure, which detaches the container from the counterdie (4).

A description has been given of an illustrative form of application of the process, which may vary according to the form of container to be obtained, always observing the fundamental innovation of the wall of external formation at a temperature of about 175°–180° C., which represents the temperature of maximum crystallization rate, where it remains for a very short time, essentially variable with the thickness of the sheet necessary to reach the highest threshold. The container is then immediately coupled to a completely internal form, cold and kept under suction to be able to extract the formed container, crystallized and heat resistant, regardless of its form. Consequently, the container treated in this way has no localized fragility, has acquired high tenacity and can be inserted in boiling water or even in steam superheated to 130° C., without deformation.

What is claimed is:

1. A method of production of a container of polyethyleneterephthalate stretched in the longitudinal and radial direction from a sheet of amorphous, polyethyleneterephthalate which consists of the following steps:

(a) preheating the sheet of amorphous, polyethyleneterephthalate to such a temperature that said sheet is preheated, softened and may be drawn;

(b) placing said sheet in a die having a female mold and a male plug, said male plug having a truncated cone shape with side surfaces upwardly converging; said female mold having a bottom and side walls;

(c) heating said female mold to a temperature of about 175°–180° C.;

(d) heating said male plug to a temperature of about 160°–166° C.;

(e) drawing said preheated sheet into contact with the bottom of said female mold by pressing with said male plug and longitudinally drawing the sheet whereby only the drawn bottom part crystallizes in contact with the bottom of said female mold;

(f) introducing compressed air or inert gas into the space between the female mold and said sheet, to cause said sheet to adhere to the male plug;

(g) introducing then compressed air or inert gas into the space between said male plug and said sheet, whereby said sheet separates from the sides of the male plug, comes in contact with the heated surface of the female mold, stretching in the radial direction occurs, the sheet crystallizes and the container of polyethyleneterephthalate stretched in the longitudinal and radial direction is obtained;

(h) cooling said container from step (g) and withdrawing it from the die.

2. The method of claim 1, wherein the cooling and withdrawing of the container is obtained by introducing a counterdie in the container, said counterdie having a shape complementary of the container and being cooled by the circulation of cold water or cooling liquid at 5° C. and connected to a vacuum pump by peripheral holes.

3. The method of claim 1, wherein the female mold has a slightly truncated cone shape, with the side walls divergent in the upward direction.

* * * * *